United States Patent
Tucker et al.

(10) Patent No.: US 9,863,392 B1
(45) Date of Patent: *Jan. 9, 2018

(54) SYSTEMS AND METHODS FOR PROVIDING DRIVING INSURANCE FOR AN INDIVIDUAL DRIVER

(71) Applicant: United Services Automobile Association (USAA), San Antonio, TX (US)

(72) Inventors: Robert Lance Tucker, Kaysville, UT (US); Bradly Jay Billman, Celina, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/483,394

(22) Filed: Apr. 10, 2017

Related U.S. Application Data

(63) Continuation of application No. 12/492,232, filed on Jun. 26, 2009, now Pat. No. 9,616,849.

(51) Int. Cl.
| | |
|---|---|
| G06Q 40/00 | (2012.01) |
| F02N 11/10 | (2006.01) |
| B60R 16/03 | (2006.01) |
| F02D 41/26 | (2006.01) |
| G06Q 40/08 | (2012.01) |

(52) U.S. Cl.
CPC .......... *F02N 11/101* (2013.01); *B60R 16/03* (2013.01); *F02D 41/26* (2013.01); *G06Q 40/08* (2013.01)

(58) Field of Classification Search
None
See application file for complete search history.

(56) References Cited

U.S. PATENT DOCUMENTS

| | | | | |
|---|---|---|---|---|
| 5,623,403 | A * | 4/1997 | Highbloom | G06Q 10/087 700/90 |
| 6,584,381 | B2 * | 6/2003 | Gehrke | B60R 25/04 701/1 |
| 7,366,677 | B1 * | 4/2008 | Liu | B60R 25/00 340/5.25 |
| 7,457,418 | B2 * | 11/2008 | Bunte | G07B 15/00 380/270 |
| 2002/0049520 | A1 * | 4/2002 | Mays | B61L 15/0027 701/19 |

(Continued)

*Primary Examiner* — Chika Ojiaku
(74) *Attorney, Agent, or Firm* — Baker Hostetler LLP

(57) ABSTRACT

A system for providing driving insurance for an individual driver may comprise at least one subsystem implemented on one or more computing systems configured for electronically calculating a risk of insuring a driver for liability arising from a vehicle accident regardless of any specific vehicle driven by the driver during the accident, at least one subsystem implemented on one or more computing systems configured for electronically and automatically calculating an insurance premium rate based on the previously calculated risk, and at least one subsystem implemented on one or more computing systems configured for electronically preparing an insurance policy according to the calculated premium rate wherein the insurance policy provides liability vehicle insurance covering the driver regardless of any specific vehicle driven by the driver during an accident.

20 Claims, 10 Drawing Sheets

(56) References Cited

U.S. PATENT DOCUMENTS

| | | | |
|---|---|---|---|
| 2003/0034873 A1* | 2/2003 | Chase | G06Q 10/02 340/5.2 |
| 2004/0073440 A1* | 4/2004 | Garbers | G06Q 10/02 705/5 |
| 2004/0260579 A1* | 12/2004 | Tremiti | G06Q 40/08 705/4 |
| 2006/0010023 A1* | 1/2006 | Tromczynski | G06Q 10/06314 705/7.25 |
| 2006/0041513 A1* | 2/2006 | Yuhara | B60R 25/24 705/59 |
| 2007/0198311 A1* | 8/2007 | Menendez | G06Q 10/02 705/5 |
| 2007/0239494 A1* | 10/2007 | Stephens | G06Q 10/02 705/5 |
| 2008/0055058 A1* | 3/2008 | Nishiyama | G07C 5/008 340/438 |
| 2008/0097798 A1* | 4/2008 | DeVallance | G06Q 10/02 705/5 |
| 2009/0309709 A1* | 12/2009 | Bevacqua | B60R 25/102 340/426.18 |
| 2010/0211270 A1* | 8/2010 | Chin | B62D 6/007 701/44 |
| 2010/0231351 A1* | 9/2010 | Lickfelt | B60R 25/04 340/5.6 |
| 2012/0173128 A1* | 7/2012 | Peeler | G06Q 10/06 701/113 |
| 2012/0190386 A1* | 7/2012 | Anderson | G01C 15/04 455/456.3 |
| 2012/0197096 A1* | 8/2012 | Ridder | A61B 5/0075 600/314 |
| 2012/0234708 A1* | 9/2012 | Chabot | B60R 11/02 206/320 |

* cited by examiner

SYSTEMS AND METHODS FOR PROVIDING DRIVING INSURANCE FOR AN INDIVIDUAL DRIVER

CROSS-REFERENCE TO RELATED APPLICATION

This application is a continuation of U.S. patent application Ser. No. 12/492,232 filed on Jun. 26, 2009 now U.S. Pat. No. 9,616,849, the contents of which is incorporated herein by reference in its entirety.

BACKGROUND

Currently, the vehicle insurance framework requires insurance for each vehicle a member owns, even if they are a single member. Adding to the problem is that the discounts for lower mileage cars are not significant enough to truly be a benefit to the insurance customer. Today, one of the larger rating factors deals with the damage that the vehicle itself can visit upon other vehicles. As the vehicles on the road become more homogenous, the risks presented by the vehicles themselves become less differentiated between them. Thus, providing vehicle insurance to a driver based on what specific vehicle they drive is becoming less important and is not needed. Also, current insurance models and frameworks may not accurately risk the driver themselves and may impose higher than needed premiums based on the number of vehicles on an insurance policy rather than the risk of driving in general.

In this regard, there is a need for systems and methods that overcome the shortcomings described above and others.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, systems methods for providing driving insurance for an individual driver are described herein. For several embodiments, a system for providing driving insurance for an individual driver may comprise at least one subsystem implemented on one or more computing systems configured for electronically calculating a risk of insuring a driver for liability arising from a vehicle accident regardless of any specific vehicle driven by the driver during the accident, at least one subsystem implemented on one or more computing systems configured for electronically and automatically calculating an insurance premium rate based on the previously calculated risk, and at least one subsystem implemented on one or more computing systems configured for electronically preparing an insurance policy according to the calculated premium rate wherein the insurance policy provides liability vehicle insurance covering the driver regardless of any specific vehicle driven by the driver during an accident.

Other features and embodiments are described below.

BRIEF DESCRIPTION OF THE DRAWINGS

Systems methods for providing driving insurance for an individual driver are further described with reference to the accompanying drawings in which.

DETAILED DESCRIPTION

Certain specific details are set forth in the following description and figures to provide a thorough understanding of various embodiments. Certain well-known details often associated with computing and software technology are not set forth in the following disclosure to avoid unnecessarily obscuring the various embodiments. Further, those of ordinary skill in the relevant art will understand that they can practice other embodiments without one or more of the details described below. Finally, while various methods are described with reference to steps and sequences in the following disclosure, the description as such is for providing a clear implementation of various embodiments, and the steps and sequences of steps should not be taken as required to practice the embodiments.

Figure 1:
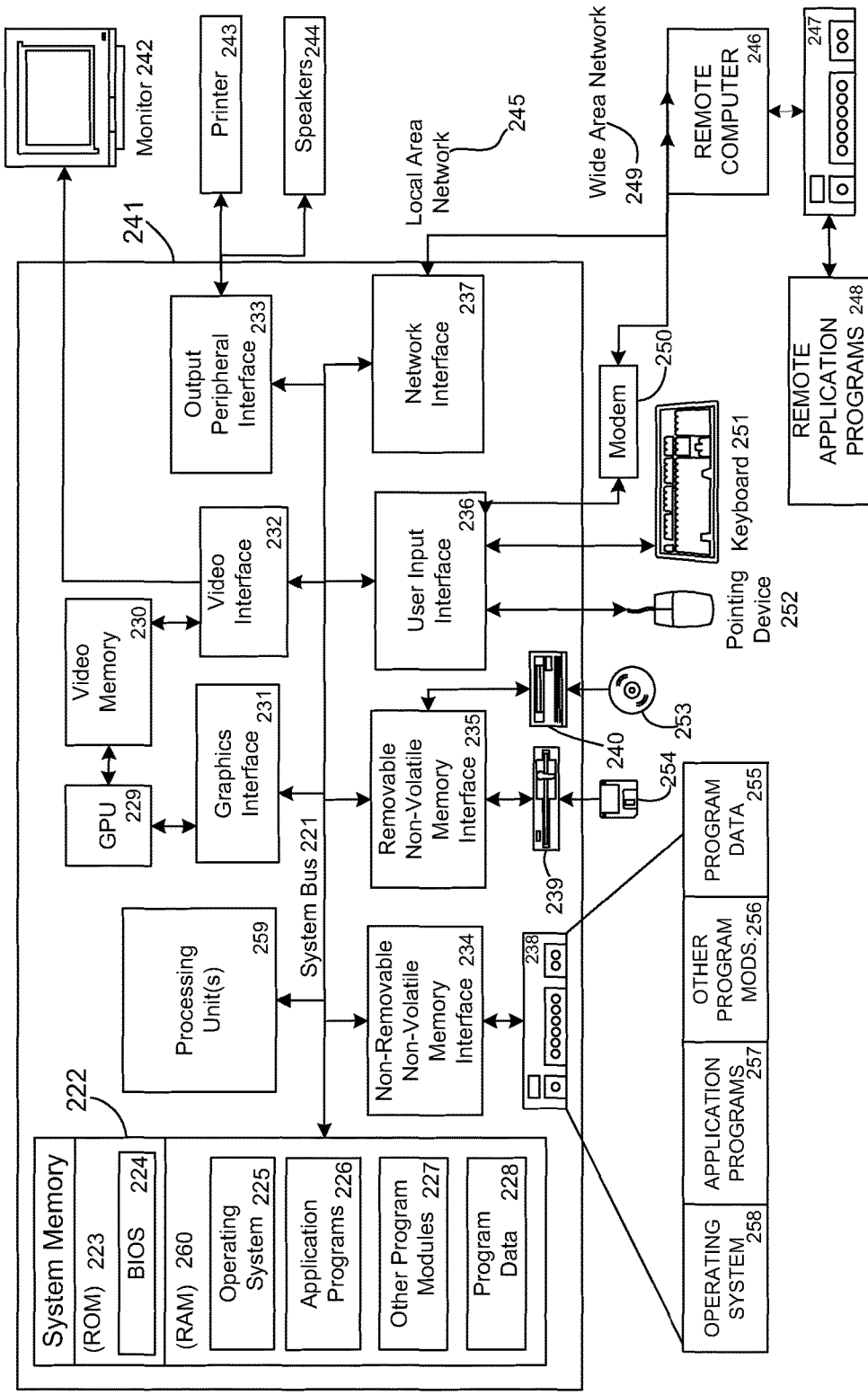
FIG. 1 is a block diagram representing an exemplary computing environment suitable for use in conjunction with implementing systems methods for providing driving insurance for an individual driver.

Referring next to FIG. 1, shown is a block diagram representing an exemplary computing environment suitable for use in conjunction with implementing the processes described below. For example, the computer-executable instructions that carry out the processes and methods for providing driving insurance for an individual driver may reside and/or be executed in such a computing environment as shown in FIG. 1. The computing environment 220 is only one example of a suitable computing environment and is not intended to suggest any limitation as to the scope of use or functionality of the embodiments. Neither should the computing environment 220 be interpreted as having any dependency or requirement relating to any one or combination of components illustrated in the exemplary computing environment 220. For example a mobile device may also include one or more items such as those described below for use in conjunction with implementing the processes described below.

Aspects of the embodiments are operational with numerous other general purpose or special purpose computing environments or configurations. Examples of well-known computing systems, environments, and/or configurations that may be suitable for use with the embodiments include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the embodiments may be implemented in the general context of computer-executable instructions, such as program modules, being executed by a computer. Generally, program modules include routines, programs, objects, components, data structures, etc. that perform particular tasks or implement particular abstract data types. Aspects of the embodiments may also be practiced in distributed computing environments where tasks are performed by remote processing devices that are linked through a communications network. In a distributed computing environment, program modules may be located in both local and remote computer storage media including memory storage devices.

An exemplary system for implementing aspects of the embodiments includes a general purpose computing device in the form of a computer 241. Components of computer 241 may include, but are not limited to, a processing unit 259, a system memory 222, a graphics interface 231, a graphics processing unit (GPU) 229, video memory 230, video interface 232 and a system bus 221 that couples various system components including the system memory 222 to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and include both volatile and nonvolatile media, removable and non-removable media. By way of example, and not limitation, computer readable media may comprise computer storage media and communication media. Computer storage media include volatile and nonvolatile, removable and non-removable media implemented in any method or technology for storage of information such as computer readable instructions, data structures, program modules or other data. Computer storage media include, but are not limited to, random access memory (RAM), read-only memory (ROM), Electrically Erasable Programmable Read-Only Memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 241. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared and other wireless media. Combinations of the any of the above should also be included within the scope of computer readable media.

The system memory 222 includes computer storage media in the form of volatile and/or nonvolatile memory such as ROM 223 and RAM 260. A basic input/output system (BIOS) 224, containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1 provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus 221, but may be connected by other interface and bus structures, such as a parallel port, game port or a universal serial bus (USB). A monitor 242 or other type of display device is also connected to the system bus 221 via an interface, such as a video interface 232. In addition to the monitor 242, computer 241 may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device 247. By way of example, and not limitation, FIG. 1 illustrates remote application programs 248 as residing on the remote memory storage device 247. It will be appreciated that the network connections shown are exemplary and other means of establishing a communications link between the computers may be used.

It should be understood that the various techniques described herein may be implemented in connection with hardware or software or, where appropriate, with a combination of both. As used herein a "system" or "subsystem" may comprise one or more of, or any combination of, the following: mechanical devices, hardware, components of hardware, circuits, circuitry, logic design, logical components, software, software modules, components of software or software modules, software procedures, software instructions, software routines, software objects, software functions, software classes, software programs, files containing software, etc., to perform the intended function of the system or subsystem. Thus, the methods and apparatus of the embodiments, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the embodiments. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the embodiments, e.g., through the use of an application programming interface (API), reusable controls, or the like. Such programs are preferably implemented in a high level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the embodiments in the context of one or more stand-alone computer systems, the embodiments are not so limited, but rather may be implemented in connection with any computing environment, such as a network or distributed computing environment. Still further, aspects of the embodiments may be implemented in or across a plurality of processing chips or devices, and storage may similarly be effected across a plurality of devices. Such devices might include personal computers, network servers, handheld devices, supercomputers, or computers integrated into other systems such as vehicles and airplanes.

Figure 2:
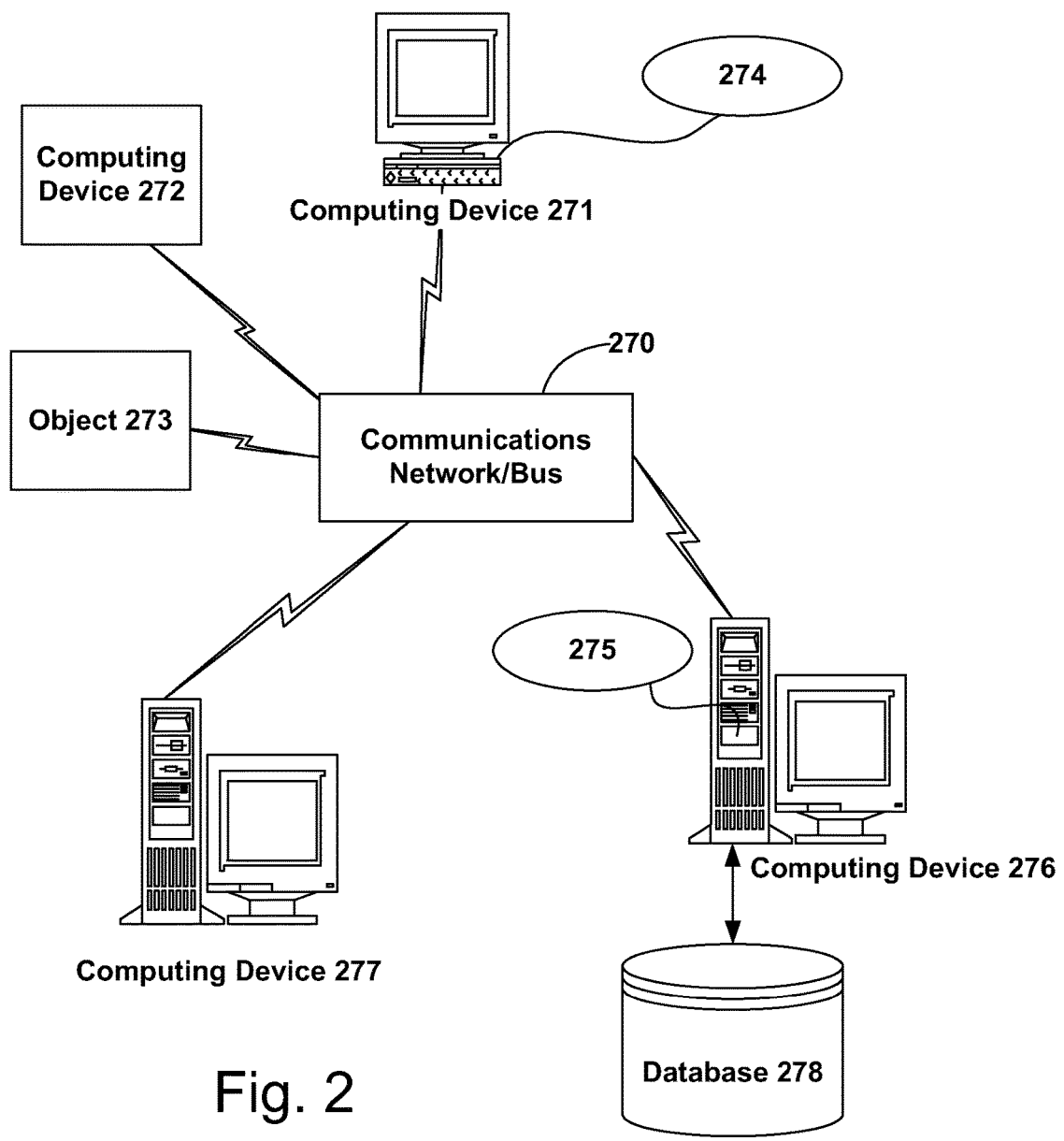
FIG. 2 illustrates an exemplary networked computing environment in which many computerized processes may be implemented to perform providing driving insurance for an individual driver.

Referring next to FIG. 2, shown is an exemplary networked computing environment in which many computerized processes may be implemented to perform the processes described below. For example, parallel or distributed computing may be part of such a networked environment with various clients on the network of FIG. 2 using and/or implementing aspects of providing driving insurance for an individual driver. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with aspects of the embodiments, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture. Instead, the embodiments should be construed in breadth and scope in accordance with the appended claims.

Figure 3:
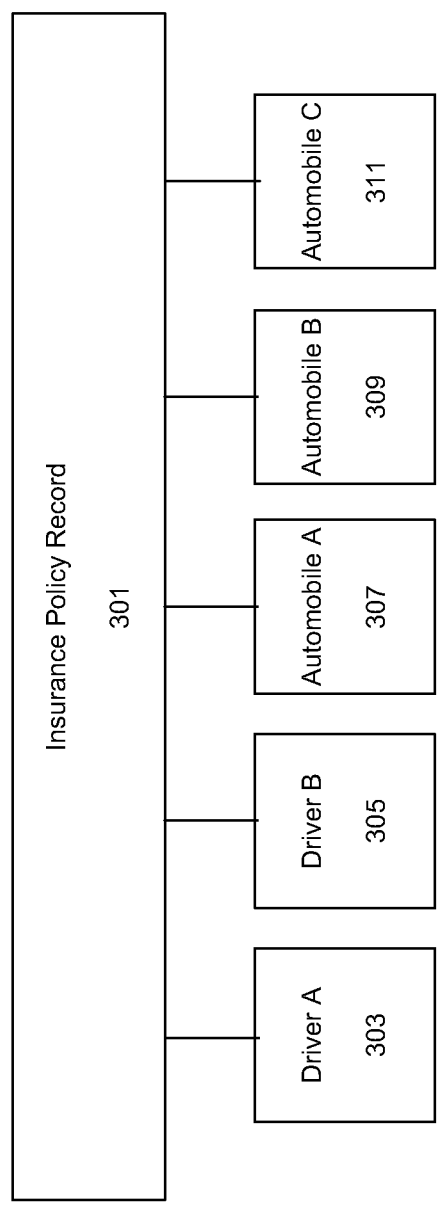
FIG. 3 is a block diagram of an example insurance policy record for a traditional insurance policy.

Referring next to FIG. 3 shown is a block diagram of an example insurance policy record for a traditional insurance policy. Traditionally, insurance policies may include a number of specific drivers that are insured for driving specific vehicle. For example, the specific drivers may be those members of a particular family and the specific vehicles may be those owned by various members of the family. Shown as an example in FIG. 3 is the insurance policy record 301 stored on a computer readable medium of an insurance company. As part of the insurance policy record shown are the specific divers covered under the insurance policy (e.g., Driver A 303 and Driver B 305). Also shown are the specific vehicles covered under the insurance policy 301 (e.g., Vehicle A 307, Vehicle B 309 and Vehicle C 311). In the example provided in FIG. 3, Driver A and Driver B are only insured for liability arising from a vehicle accident while driving Vehicle A 307, Vehicle B 309 or Vehicle C 311. If Driver A 303 or Driver B 305 were to drive other vehicles (such as a friend's vehicle, for example) they would not be covered under the insurance policy associated with the Insurance Policy Record 301.

Figure 4:
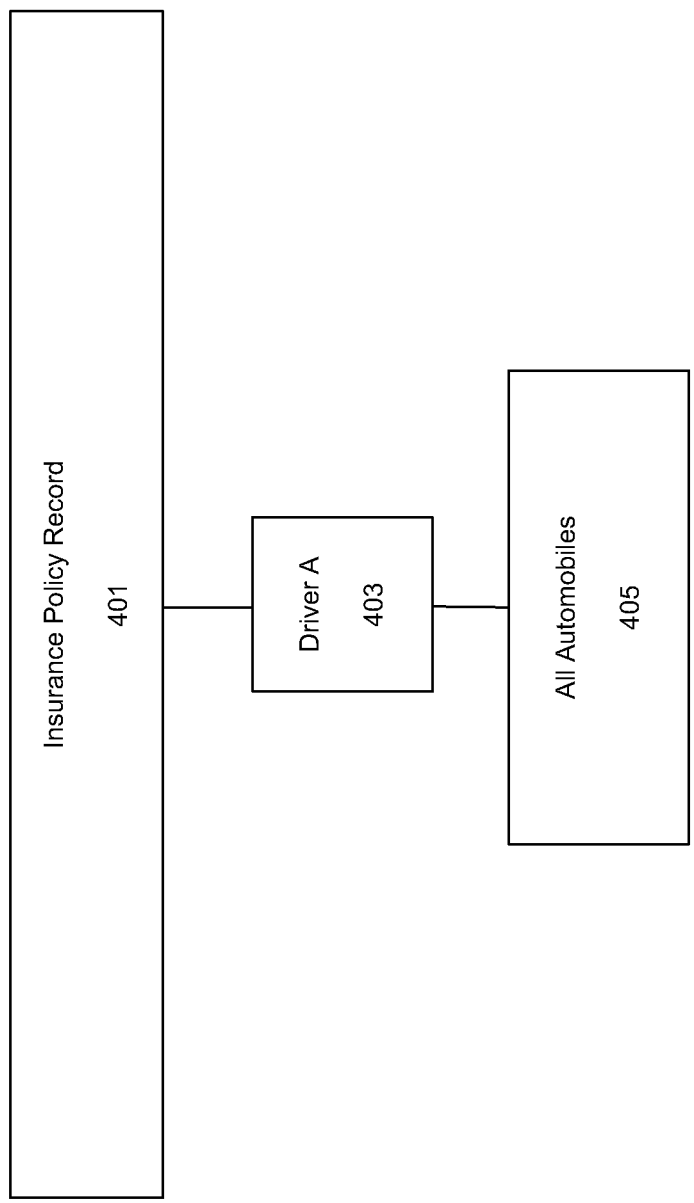
FIG. 4 is a block diagram of an example insurance policy record according to providing driving insurance for an individual driver for driving any vehicle.

Referring next to FIG. 4, shown is a block diagram of an example insurance policy record according to providing driving insurance for an individual driver for driving any vehicle. Shown as an example in FIG. 4 is the insurance policy record 401 stored on a computer readable medium of an insurance company. As part of the insurance policy record shown is a specific diver covered under the insurance policy (e.g., Driver A 303). However, under the insurance policy of insurance policy record 401, Driver A 403 is insured for liability arising from a vehicle accident while driving all vehicles 405 instead of only one or more specific vehicles. In this way, Driver A is free to drive any vehicle (friends' cars, rental cars, etc.) knowing that he or she has insurance coverage under their insurance policy.

Figure 5:
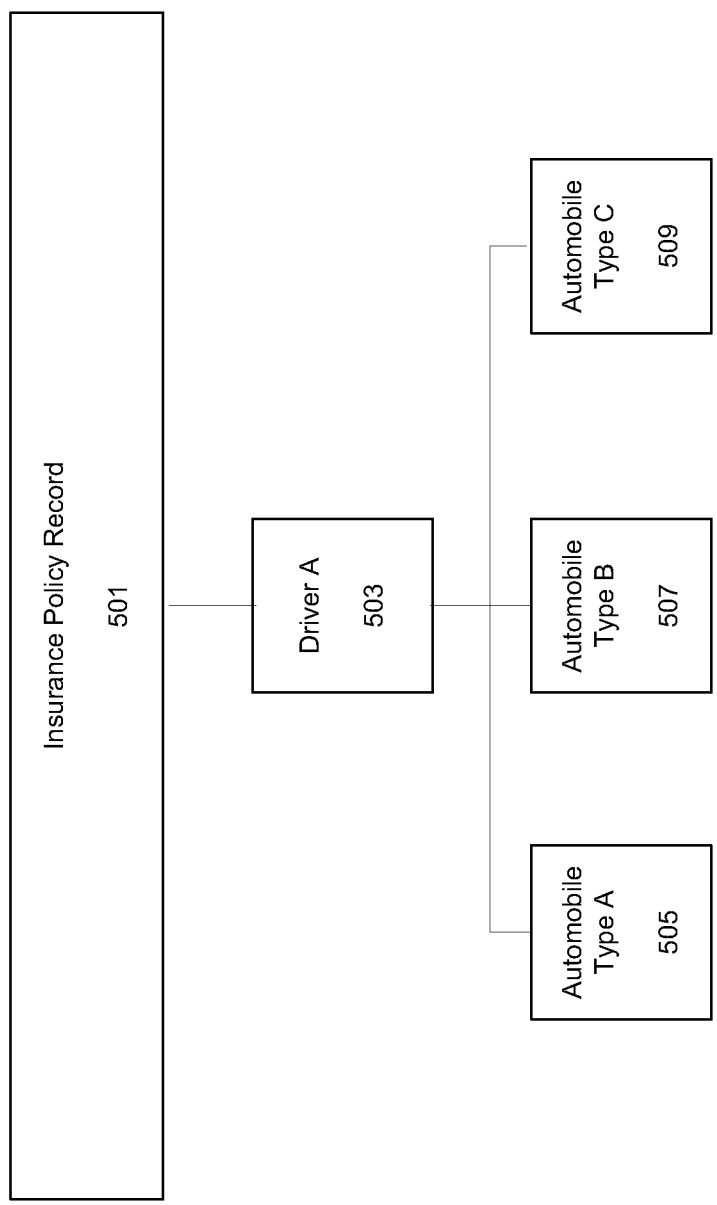
FIG. 5 is a block diagram of an example insurance policy record according to providing driving insurance for an individual driver for driving particular types of vehicles.

Referring next to FIG. 5, shown is a block diagram of an example insurance policy record according to providing driving insurance for an individual driver for driving particular types of vehicles. Shown as an example in FIG. 5 is the insurance policy record 501 stored on a computer readable medium of an insurance company. As part of the insurance policy record 501 shown is a specific driver covered under the insurance policy (e.g., Driver A 503). However, under the insurance policy of insurance policy record 501, Driver A 503 is insured for liability arising from a vehicle accident while driving 3 specific types, categories or classes of vehicles (e.g., Vehicle Type A 505, Vehicle Type B 507, Vehicle Type C 509). In this way, Driver A is free to drive any vehicle (friends' cars, rental cars, etc.) of a specific type, category or class as indicated in the insurance policy record 501, knowing that he or she has insurance coverage under their insurance policy for driving a vehicle of that specific type, category or class. The number of vehicle types under the insurance policy record 501 may vary and be more or less than that shown in FIG. 5

The types, categories or classes of vehicles may be defined based on various factors or characteristics of vehicles including, but not limited to, one or more of the following: vehicle size, vehicle weight, vehicle engine type, vehicle model, classification as a sports car, classification as a truck, classification as a farm vehicle, vehicle brand, age of vehicle, safety features of vehicle, state, country or province in which vehicle is licensed, etc. Optionally, the types of vehicles for which Driver A 501 may be insured under the insurance policy record 501 may also change automatically depending on various characteristics of Driver A 501 that may change over time including, but not limited to, one or more of the following: age of driver, driver's driving record, previous vehicle accidents of driver, education of driver, school grades of driver, whether driver has completed a driver education course, previous experience driving particular types of vehicles, etc. these types may be automatically added or removed from the insurance policy record 501 and electronic notifications automatically sent to Driver A 503 or others accordingly.

Figure 6:
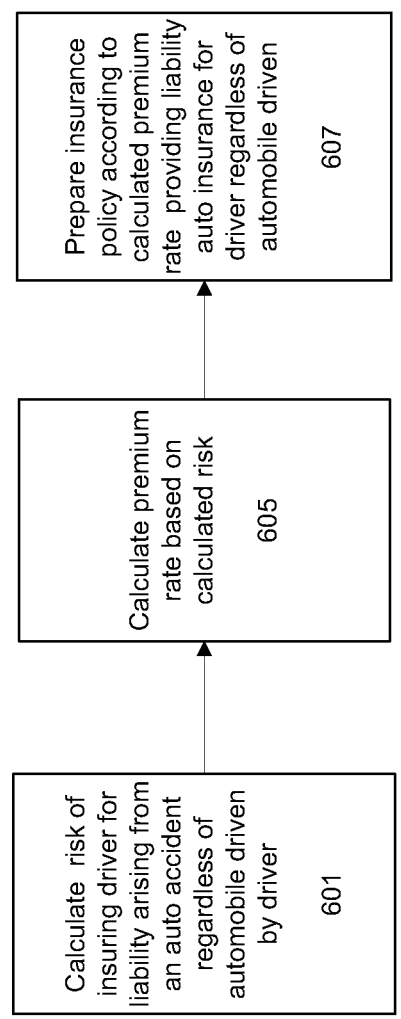
FIG. 6 is a flow chart illustrating an example process for providing driving insurance for an individual driver for driving any vehicle.

Referring next to FIG. 6, shown is a flow chart illustrating an example process for providing driving insurance for an individual driver for driving any vehicle. First, a risk is electronically calculated 601 of insuring a driver for liability arising from a vehicle accident regardless of the vehicle driven by the driver. This may be calculated based on factors having to do with an individual driver including, but not limited to, one or more of the following: age of driver, driver's driving record, previous vehicle accidents of driver, education of driver, school grades of driver, whether driver has completed a driver education course, previous experience driving particular types of vehicles, average damage costs to others arising out of vehicle accidents of drivers having similar characteristics of the driver, etc. An insurance premium rate is then electronically and automatically calculated 605 based on the previously calculated risk. An insurance policy is then electronically prepared 607 according to the calculated premium rate wherein the insurance policy provides liability vehicle insurance for the driver regardless of the vehicle driven by the driver. The insurance policy may be prepared 607 in electronic format and have all the driver information and insurance rates inserted automatically and then sent electronically to the driver for their electronic signature, for example. This process may result in an electronic insurance policy record 401 such as that shown in FIG. 4, for example, being created on a computer readable medium of an insurance company providing the insurance policy. The process above may be applied to other types of vehicles, classes of vehicles and other forms of insurable transportation as well. For example, the process may be applied to providing driver's/operating insurance for personal watercraft, boats, motorcycles, and airplanes, etc.

Figure 7:
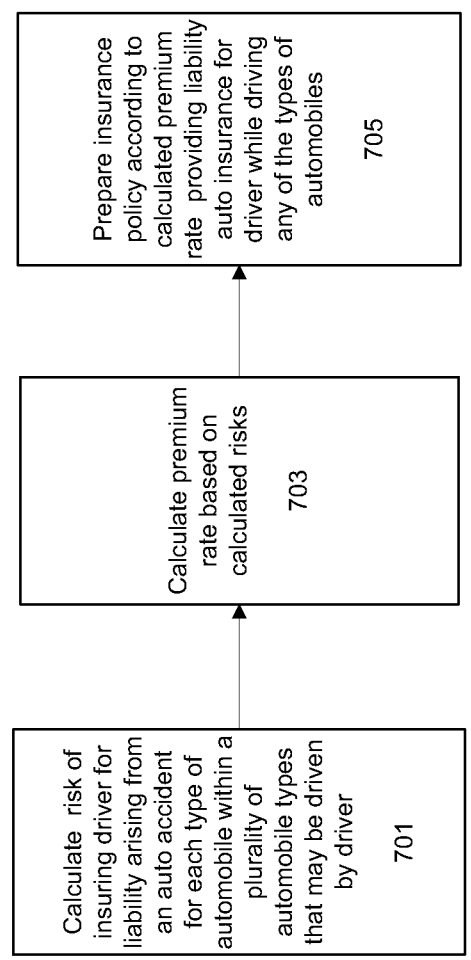
FIG. 7 is a flow chart illustrating an example process for providing driving insurance for an individual driver for driving specific types of vehicles.

Referring next to FIG. 7, shown is a flow chart illustrating an example process for providing driving insurance for an individual driver for driving specific types of vehicles. First, a risk is electronically calculated 701 of insuring a driver for liability arising from a vehicle accident for each type, category or class of vehicle (hereinafter referred to collectively as type), within a plurality of types that may be driven by driver. The specific type or types desired may be selected by the driver applying for vehicle driver insurance, for example. This may be calculated based on factors having to do with an individual driver including, but not limited to, one or more of the following: age of driver, driver's driving record, previous vehicle accidents of driver, education of driver, school grades of driver, whether driver has completed a driver education course, previous experience driving particular types of vehicles, average damage costs to others arising out of vehicle accidents of drivers having similar characteristics of the driver, etc. The risk may also be calculated based on various factors or characteristics of vehicles of the particular type including, but not limited to, one or more of the following: vehicle size, vehicle weight, vehicle engine type, vehicle model, classification as a sports car, classification as a truck, classification as a farm vehicle, vehicle brand, age of vehicle, safety features of vehicle, state, country or province in which vehicle is licensed, etc. Included in the calculation based on one or more of the factors above may be averages or statistics of damages to others arising from vehicle accidents involving vehicles having one or more of the above characteristics.

An insurance premium rate is then electronically and automatically calculated 703 based on the previously calculated risk. An insurance policy is then electronically prepared 705 according to the calculated premium rate wherein the insurance policy provides liability vehicle insurance for the driver while driving any of the selected types of vehicles. The insurance policy may be prepared 705 in electronic format and have all the driver information, insurance premium rates, and types of vehicles for which the driver is insured, inserted automatically and then sent electronically to the driver for their electronic signature, for example. This process may result in an electronic insurance policy record 501 such as that shown in FIG. 5, for example, being created on a computer readable medium of an insurance company providing the insurance policy. The process above may be applied to other types of vehicles, classes of vehicles and other forms of insurable transportation as well. For example, the process may be applied to providing driver's/operating insurance for personal watercraft, boats, motorcycles, and airplanes, etc.

Figure 8:
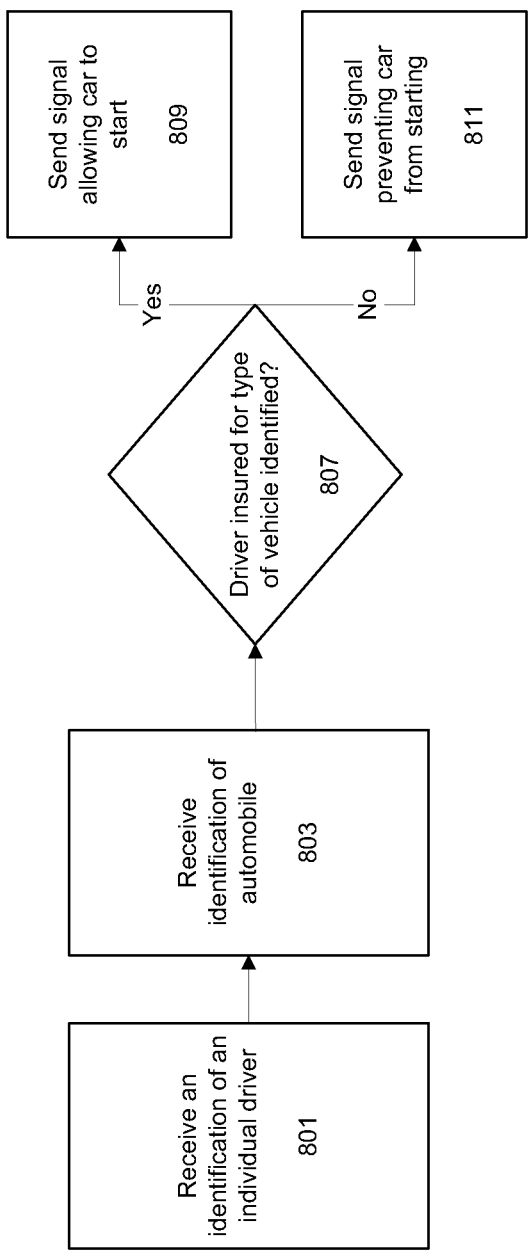
FIG. 8 is a flow chart illustrating an example process for allowing operation of a vehicle depending on whether an individual driver attempting to operate the vehicle is insured.

Referring next to FIG. 8, shown is a flow chart illustrating an example process for allowing operation of a vehicle depending on whether an individual driver attempting to operate the vehicle is insured. Whether a particular driver is insured is often an important issue in allowing a driver to operate a vehicle. For example, whether a particular driver is insured may be important when one is lending another their car, when renting cars to others, or as a way to enforce insurance laws or process insurance claims, and settle legal disputes. In many cases it may be helpful to have a technological way to prevent one from operating a vehicle when they do not have insurance. Shown in FIG. 8 is an example process illustrating such a technological solution. First, an identification of an individual driver is received 801 electronically. The identification may be triggered to be sent and received wirelessly any number of ways. For example this identification may be received wirelessly from a mobile device associated with the driver or from a device embedded in a vehicle key, key fob, or other device associated with the driver. The sending of the identification may be triggered by the driver by interacting with the mobile device or by inserting the key into an ignition of a vehicle, for example, which then sends a wireless signal from the vehicle or the mobile device to send the identification of the driver. The identification of the driver may be the driver's name, social security number, driver license number, insurance company member number, or other number or key code associated with the driver. Also, the driver identification may be received by one or more systems of an insurance company, law enforcement, vehicle owner or any other entity.

Next, or in conjunction with the receiving of the driver identification, an identification of a vehicle that the driver is attempting to drive may be received 803. The identification of the vehicle may also be received 803 wirelessly in the same manner as the driver identification above and may originate from the vehicle itself, for example. Sending of the vehicle identification may be triggered by the sending of the driver identification or when the driver inserts a key into the ignition of the vehicle. The vehicle identification may be communicated to the mobile device of the driver and sent along with the driver identification or soon thereafter or before the driver identification is sent. The vehicle identification may alternatively be communicated directly from a device within the vehicle itself. The driver identification, however, is associated with the vehicle identification and may be included as a single "drive request" that may be received 801 803. The vehicle identification may include for example, a vehicle identification number (VIN), license plate number, or any other code or number that may identify the particular vehicle. Also, an indication of a type, class or category of the vehicle may also be sent and received 803 along with or as part of the vehicle identification.

It is then automatically determined 807 if the diver is insured for driving the type of vehicle identified. This determination may be made by electronically comparing the vehicle identification received to data from various electronically availably insurance records. For example, insurance records such as those shown in FIGS. 4 and 5 may be automatically accessed for reasons of comparison. A particular driver's insurance record may be accessed by using the received identification of the driver. Then, the insurance record may be automatically read to determine the types of vehicles the driver is insured for. The types of vehicles the driver is insured for may then be compared to the type of the vehicle associated with the vehicle identification received. If the type of vehicle identified appears on the insurance policy of the driver, then it is electronically determined that the driver is insured for driving that type of vehicle. If the type of vehicle identified does not appear on the insurance policy of the driver, then it is electronically determined that the driver is not insured for driving that type of vehicle. The identification of the type of vehicle may have been received with or as part of the vehicle identification received, or may be determined based on the vehicle identification received. For example, the type of vehicle may be determined based on a VIN received.

If it is electronically determined that the driver is insured for driving that type of vehicle, then a signal is sent 809 to allow the vehicle to start. The signal may include a code or the like which the vehicle may receive via a wireless device within the vehicle. An ignition source or other mechanical device within the vehicle that allows the vehicle to start may be configured to only be enabled operable by receiving such a code that enables a switch to be activated (e.g., through a computer processor) that allows the flow of electricity needed to start the vehicle, for example. Also, the signal sent to allow the vehicle to start may first be received by a mobile device of the driver and then communicated wirelessly to the vehicle itself. Other means for allowing the vehicle to start are also contemplated and may be used.

If it is electronically determined that the driver is not insured for driving that type of vehicle, then a signal is sent 811 to prevent the vehicle to start. Alternatively, the vehicle may be prevented from starting by not sending a signal that enables operation of the vehicle. The signal to prevent the vehicle from operating may include a code or the like which the vehicle may receive via a wireless device within the vehicle. An ignition source or other mechanical device within the vehicle that allows the vehicle to start may be configured to be disabled by receiving such a code that enables a switch to be activated (e.g., through a computer processor) that disrupts the flow of electricity needed to start the vehicle, for example. Also, the signal sent to prevent the vehicle from starting may first be received by a mobile device of the driver and then communicated wirelessly to the vehicle itself. Other means for preventing the vehicle from starting are also contemplated and may be used. The process above may be applied to other types of vehicles, classes of vehicles and other forms of insurable transportation as well. For example, the process may be applied to providing driver's/operating insurance for personal watercraft, boats, motorcycles, and airplanes, etc.

Figure 9:
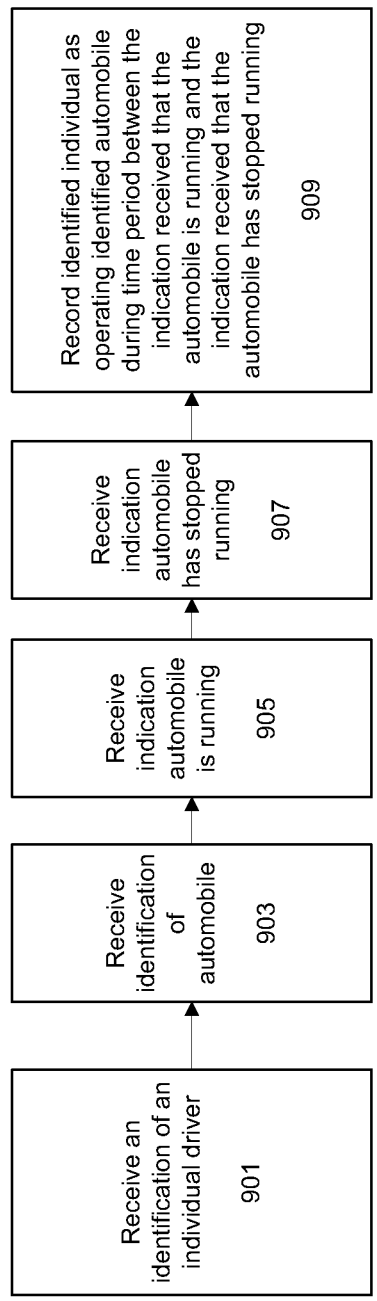
FIG. 9 is a flow chart illustrating an example process for tracking the operation of a vehicle of an individual insured driver.

Referring next to FIG. 9, shown is a flow chart illustrating an example process for tracking the operation of a vehicle of an individual insured driver. First, an identification of an individual driver may be received 901 electronically as described above with reference to FIG. 8. Next, or in conjunction with the receiving of the driver identification, an identification of a vehicle that the driver is attempting to drive may be received 903 as described above with reference to FIG. 8.

Next, an indication may be received 905 wirelessly from the vehicle itself or through a wireless device of the driver that the vehicle is running. This indication may originate from an on-board computer and/or telematics system of the vehicle equipped with one or more wireless communications devices operable for communicating such information. This information such as the time the vehicle started running may be electronically recorded or noted in a law enforcement database an insurance policy record of the driver, or other database for example. Next, an indication may be received 907 wirelessly from the vehicle itself or through a wireless device of the driver that the vehicle has stopped running. This indication may originate from an on-board computer and/or telematics system of the vehicle equipped with one or more wireless communications devices operable for communicating such information. This information such as the time the vehicle stopped running may be electronically recorded or noted in a law enforcement database, an insurance policy record of the driver, or other database for example.

It may then be electronically recorded 909 that the identified individual was operating the identified vehicle during the time period between the indications received that the vehicle is running and that the vehicle has stopped running. This information may be electronically recorded 909 or noted in a law enforcement database, an insurance policy record of the driver, or other database, for example.

Figure 10:
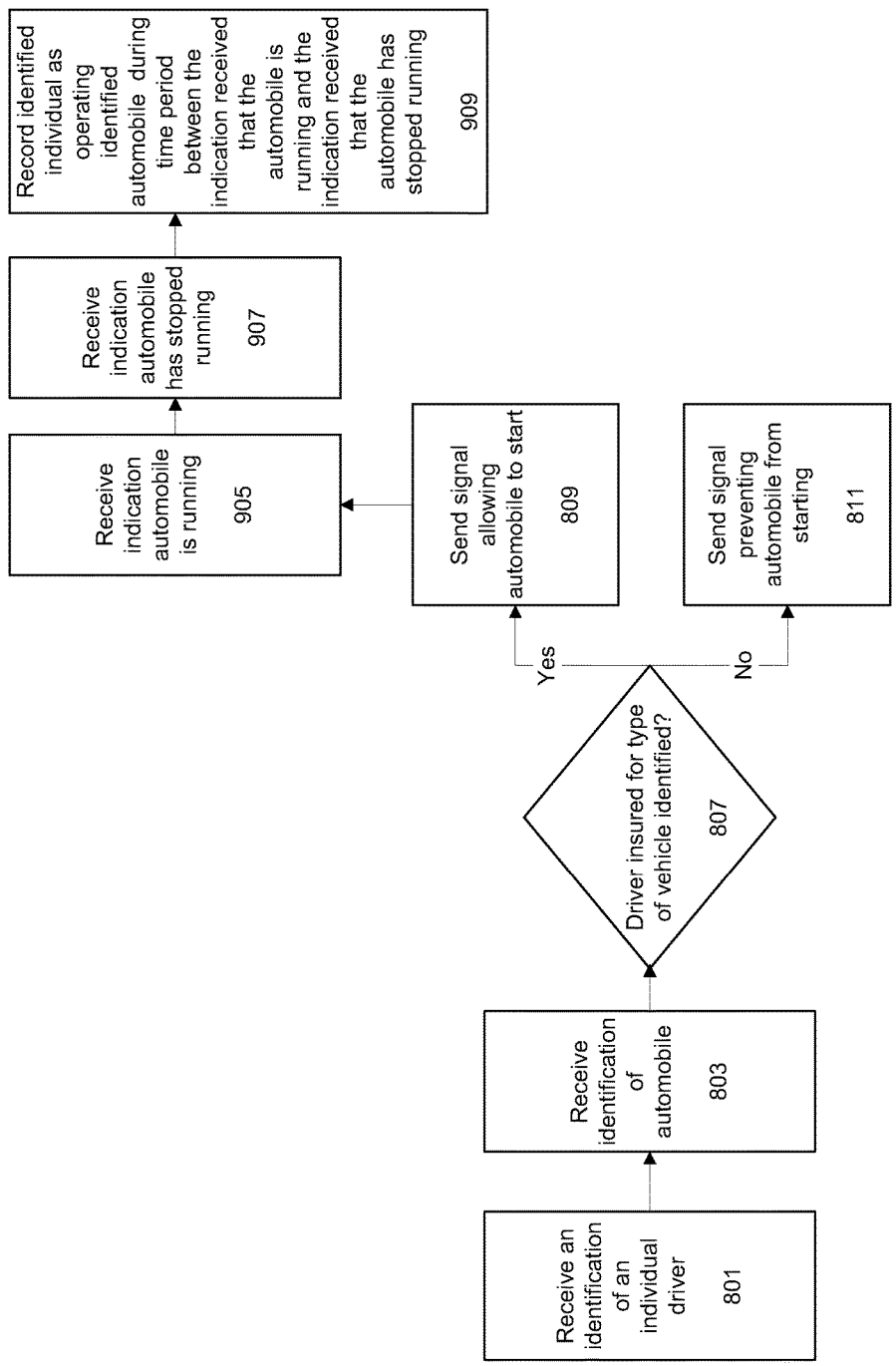
FIG. 10 is a flow chart illustrating an example process for allowing operation of and tracking the operation of a vehicle of an individual insured driver.

Referring next to FIG. 10, shown is a flow chart illustrating an example process for allowing operation of and tracking the operation of a vehicle of an individual insured driver. First, an identification of an individual driver is received 801 electronically. The identification may be triggered to be sent and received wirelessly any number of ways. For example this identification may be received wirelessly from a mobile device associated with the driver or from a device embedded in a vehicle key, key fob, or other device associated with the driver. The sending of the identification may be triggered by the driver by interacting with the mobile device or by inserting the key into an ignition of a vehicle, for example, which then sends a wireless signal from the vehicle or the mobile device to send the identification of the driver. The identification of the driver may be the driver's name, social security number, driver license number, insurance company member number, or other number or key code associated with the driver. Also, the driver identification may be received by one or more systems of an insurance company, law enforcement, vehicle owner or any other entity.

Next, or in conjunction with the receiving of the driver identification, an identification of a vehicle that the driver is attempting to drive may be received 803. The identification of the vehicle may also be received 803 wirelessly in the same manner as the driver identification above and may originate from the vehicle itself, for example. Sending of the vehicle identification may be triggered by the sending of the driver identification or when the driver inserts a key into the ignition of the vehicle. The vehicle identification may be communicated to the mobile device of the driver and sent along with the driver identification or soon thereafter or before the driver identification is sent. The vehicle identification may alternatively be communicated directly from a device within the vehicle itself. The driver identification, however, is associated with the vehicle identification and may be included as a single "drive request" that may be received 801 803. The vehicle identification may include for example, a vehicle identification number (VIN), license plate number, or any other code or number that may identify the particular vehicle. Also, an indication of a type, class or category of the vehicle may also be sent and received 803 along with or as part of the vehicle identification.

It is then automatically determined 807 if the diver is insured for driving the type of vehicle identified. This determination may be made by electronically comparing the vehicle identification received to data from various electronically availably insurance records. For example, insurance records such as those shown in FIGS. 4 and 5 may be automatically accessed for reasons of comparison. A particular driver's insurance record may be accessed by using the received identification of the driver. Then, the insurance record may be automatically read to determine the types of vehicles the driver is insured for. The types of vehicles the driver is insured for may then be compared to the type of the vehicle associated with the vehicle identification received. If the type of vehicle identified appears on the insurance policy of the driver, then it is electronically determined that the driver is insured for driving that type of vehicle. If the type of vehicle identified does not appear on the insurance policy of the driver, then it is electronically determined that the driver is not insured for driving that type of vehicle. The identification of the type of vehicle may have been received with or as part of the vehicle identification received, or may be determined based on the vehicle identification received. For example, the type of vehicle may be determined based on a VIN received.

If it is electronically determined that the driver is insured for driving that type of vehicle, then a signal is sent 809 to allow the vehicle to start. The signal may include a code or the like which the vehicle may receive via a wireless device within the vehicle. An ignition source or other mechanical device within the vehicle that allows the vehicle to start may be configured to only be enabled operable by receiving such a code that enables a switch to be activated (e.g., through a computer processor) that allows the flow of electricity needed to start the vehicle, for example. Also, the signal sent to allow the vehicle to start may first be received by a mobile device of the driver and then communicated wirelessly to the vehicle itself. Other means for allowing the vehicle to start are also contemplated and may be used.

Next, after sending 809 of the signal to allowing the vehicle to start, an indication may be received 905 wirelessly from the vehicle itself or through a wireless device of the driver that the vehicle is running. This indication may originate from an on-board computer and/or telematics system of the vehicle equipped with one or more wireless communications devices operable for communicating such information. This information such as the time the vehicle started running may be electronically recorded or noted in a law enforcement database an insurance policy record of the driver, or other database for example. Next, an indication may be received 907 wirelessly from the vehicle itself or through a wireless device of the driver that the vehicle has stopped running. This indication may originate from an on-board computer and/or telematics system of the vehicle equipped with one or more wireless communications devices operable for communicating such information. This information such as the time the vehicle stopped running may be electronically recorded or noted in a law enforcement database, an insurance policy record of the driver, or other database for example.

It may then be electronically recorded 909 that the identified individual was operating the identified vehicle during the time period between the indications received that the vehicle is running and that the vehicle has stopped running. This information may be electronically recorded 909 or noted in a law enforcement database, an insurance policy record of the driver, or other database, for example.

If it is electronically determined that the driver is not insured for driving that type of vehicle, then a signal is sent 811 to prevent the vehicle to start. Alternatively, the vehicle may be prevented from starting by not sending a signal that enables operation of the vehicle. The signal to prevent the vehicle from operating may include a code or the like which the vehicle may receive via a wireless device within the vehicle. An ignition source or other mechanical device within the vehicle that allows the vehicle to start may be configured to be disabled by receiving such a code that enables a switch to be activated (e.g., through a computer processor) that disrupts the flow of electricity needed to start the vehicle, for example. Also, the signal sent to prevent the vehicle from starting may first be received by a mobile device of the driver and then communicated wirelessly to the vehicle itself. Other means for preventing the vehicle from staring are also contemplated and may be used.

Also, other information may be received during the operation of the vehicle originating from an on-board computer and/or telematics system of the vehicle equipped with one or more wireless communications devices operable for communicating such information. Such information may be associated with a driver identified as associated with the starting of the vehicle and recorded 909 or noted in a law enforcement database, an insurance policy record of the driver, or other database. This information may originate directly from the vehicle or be first communicated to a mobile device associated with the driver and then communicated to other remote systems (e.g., insurance or law enforcement systems). This information may also be used in the calculation of determining future insurance rates, premiums, for providing feedback to the driver regarding their driving, for parental tracking of children's driving, as evidence regarding vehicle accidents, and as evidence in other legal disputes, etc. The process above may be applied to other types of vehicles, classes of vehicles and other forms of insurable transportation as well. For example, the process may be applied to providing driver's/operating insurance for personal watercraft, boats, motorcycles, and airplanes, etc.

It is noted that the foregoing examples have been provided merely for the purposes of explanation and are in no way to be construed as limiting of the present invention. While the invention has been described with reference to various embodiments, it is understood that the words which have been used herein are words of description and illustration, rather than words of limitations. Further, although embodiments have been described herein with reference to particular means and materials, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A system comprising:
   a processor; and
   a memory coupled to the processor, the memory comprising instructions that when executed by the processor, cause the processor to execute operations comprising:
   electronically generating an insurance policy for a vehicle;

transmitting, wirelessly, the insurance policy;
receiving, wirelessly, an executed insurance policy;
receiving an identifier of the vehicle;
accessing the executed insurance policy based on the identifier of the vehicle;
determining the vehicle is insured for operation or not insured for operation, based on the executed insurance policy and the identifier associated with the vehicle; and if the vehicle is determined to be insured for operation, sending a signal configured to enable the vehicle to start.

2. The system of claim 1, the operations further comprising:
if the vehicle is determined to be not insured for operation, determining not to send a signal configured to enable the vehicle to start.

3. The system of claim 1, the operations further comprising:
if the vehicle is determined to be not insured for operation, sending a signal configured to prevent the vehicle from starting.

4. The system of claim 1, the operations further comprising:
if the vehicle is determined to be not insured for operation, sending a signal configured to prevent the vehicle from starting, wherein the signal to prevent the vehicle from starting comprises a code configured to disable a mechanical device within the vehicle.

5. The system of claim 1, the operations further comprising:
after sending the signal configured to enable the vehicle to start, receiving an indication that the vehicle is running; and
electronically recording a time associated with the indication.

6. The system of claim 1, the operations further comprising:
after sending the signal configured to enable the vehicle to start, receiving an indication that the vehicle is running;
electronically recording a time associated with the indication;
receiving another indication that the vehicle has stopped running;
electronically recording another time associated with the another indication; and calculating a time period associated with the vehicle running based on the time associated with the indication that the vehicle is running and the another time associated with the another indication that the vehicle has stopped running.

7. The system of claim 1, the operations further comprising:
after sending the signal configured to enable the vehicle to start, receiving an indication that the vehicle is running; and electronically recording a time associated with the indication, wherein the receiving the indication comprises receiving the indication that the vehicle is running from a telematics system of the vehicle.

8. The system of claim 1, the operations further comprising:
if the vehicle is determined to be insured for operation, sending a signal configured to enable the vehicle to start to a mobile device associated with the vehicle.

9. The system of claim 1, wherein the signal configured to enable the vehicle to start comprises a code configured to enable an ignition source of the vehicle.

10. The system of claim 1, wherein the signal configured to enable the vehicle to start comprises a code configured to enable an activation of a switch of the vehicle, wherein the activation of the switch is configured to allow a flow of electricity in the vehicle.

11. The system of claim 1, wherein the receiving the identifier comprises receiving an identification of a vehicle user from a mobile device embedded in a vehicle key associated with the vehicle user.

12. The system of claim 11, wherein the identification of the vehicle user comprises an insurance company member number.

13. The system of claim 12, wherein the identification of the vehicle user comprises a number or a keycode associated with the vehicle user.

14. The system of claim 1, wherein the receiving an identifier of the vehicle comprises receiving an identifier of the vehicle from the vehicle.

15. The system of claim 1, wherein the insurance policy covers a vehicle type; and wherein the determining the vehicle to be insured for operation or to be not insured for operation comprises determining whether the vehicle comprises the vehicle type.

16. A method comprising:
electronically generating, by a computing device, an insurance policy for a vehicle;
transmitting, wirelessly, the insurance policy;
receiving, wirelessly, an executed insurance policy;
receiving an identifier of the vehicle;
accessing the executed insurance policy based on the identifier of the vehicle;
determining the vehicle be insured for operation or to be not insured for operation, based on the executed insurance policy and the identifier of the vehicle; and if the vehicle is determined to be insured to for operation, sending a signal configured to enable the vehicle to start.

17. The method of claim 16, further comprising:
if the vehicle is determined to be not insured for operation, sending a signal configured to prevent the vehicle from starting, wherein the signal to prevent the vehicle from starting comprises a code configured to disable a mechanical device within the vehicle.

18. The method of claim 17, further comprising:
after sending the signal configured to enable the vehicle to start, receiving an indication that the vehicle is running;
electronically recording a time associated with the indication;
receiving another indication that the vehicle has stopped running;
electronically recording another time associated with the another indication; and calculating a time period associated with the vehicle running based on the time associated with the indication that the vehicle is running and the another time associated with the another indication that the vehicle has stopped running.

19. A non-transitory computer-readable medium comprising instructions that cause a processor executing the instructions to effectuate operations comprising:
electronically generating an insurance policy for a user;
transmitting, wirelessly, the insurance policy;
receiving, wirelessly, an executed insurance policy;
receiving an identification of the user;
receiving an identification of a vehicle;
accessing the executed insurance policy based on the identification of the user;
determining the vehicle to be insured for operation or to be not insured for operation, based on the executed insurance policy and the identification of the user; and if the vehicle is determined to be insured for operation, sending a signal configured to enable the vehicle to start.

20. The non-transitory computer-readable medium of claim 19, the operations further comprising:
if the vehicle is determined to be not insured for operation, sending a signal configured to prevent the vehicle from starting.

\* \* \* \* \*